US008489606B2

(12) United States Patent
Lee et al.

(10) Patent No.: US 8,489,606 B2
(45) Date of Patent: Jul. 16, 2013

(54) MUSIC SEARCH APPARATUS AND METHOD USING EMOTION MODEL

(75) Inventors: Seung-Jae Lee, Daejeon (KR);
Jung-Hyun Kim, Daejeon (KR);
Sung-Min Kim, Daejeon (KR);
Young-Ho Suh, Daejeon (KR);
Yong-Seok Seo, Daejeon (KR);
Jee-Hyun Park, Daejeon (KR);
Sang-Kwang Lee, Daejeon (KR);
Jung-Ho Lee, Gangwon-do (KR);
Young-Suk Yoon, Seoul (KR);
Won-Young Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/220,838

(22) Filed: Aug. 30, 2011

(65) Prior Publication Data
US 2012/0054238 A1 Mar. 1, 2012

(30) Foreign Application Priority Data

Aug. 31, 2010 (KR) .................. 10-2010-0084965
Jun. 3, 2011 (KR) .................. 10-2011-0053785

(51) Int. Cl.
*G06F 7/00* (2006.01)
*G06F 17/30* (2006.01)

(52) U.S. Cl.
USPC ............................ 707/738; 707/772; 707/916

(58) Field of Classification Search
USPC ................. 707/731, 738, 743, 772, 912, 916
See application file for complete search history.

(56) References Cited

U.S. PATENT DOCUMENTS

| 6,263,334 | B1 * | 7/2001 | Fayyad et al. ............... 707/737 |
| 2002/0002899 | A1 * | 1/2002 | Gjerdingen et al. ............ 84/667 |
| 2005/0092161 | A1 | 5/2005 | Urata |
| 2007/0208990 | A1 | 9/2007 | Kim et al. |
| 2010/0145892 | A1 * | 6/2010 | Yang et al. .................. 706/12 |

FOREIGN PATENT DOCUMENTS

| KR | 1020070010515 A | 1/2007 |
| KR | 1020070087398 A | 8/2007 |
| KR | 1020090033750 A | 4/2009 |
| KR | 1020100024769 A | 3/2010 |

OTHER PUBLICATIONS

Yang et al. ("Mr. Emo:Music Retrieval in the Emotion Plane" Oct. 2008. MM '08 Proceedings of the 16th ACM international conference on Multimedia. pp. 1003-1004.*

(Continued)

*Primary Examiner* — James E Richardson
(74) *Attorney, Agent, or Firm* — Ladas & Parry LLP

(57) ABSTRACT

A music search apparatus using an emotion model includes a music database (DB) for storing sound source data about a plurality of pieces of music and Arousal-Valence (AV) coefficients of the respective pieces of music. An emotion model generation unit classifies different emotion types into a plurality of groups, and generates an emotion classification model from using respective probability distributions of the plurality of groups for an AV coefficient plane. A music search unit identifies an emotion type from using information entered by a user when a music search request is received, detects an AV coefficient range for designating an AV coefficient corresponding to the identified emotion type from using the emotion classification model, and searches the music DB for music corresponding to the AV coefficient range.

9 Claims, 11 Drawing Sheets

OTHER PUBLICATIONS

Sun et al. ("Personalized Emotion Space for Video Affective Content Representation" Oct. 1, 2009. Wuhan University Journal of Natural Sciences, vol. 14, No. 5. pp. 393-398.*

Soleymani et al. ("A collaborative personalized affective video retrieval system". Sep. 2009. 3rd International Conference on Affective Computing and Intelligent Interaction and Workshops, 2009. ACII 2009. pp. 1-2.*

Kierkels et al. Queries and Tags in Affect-Based Multimedia Retrieval 2009. IEEE International Conference on Multimedia and Expo, 2009. ICME 2009. pp. 1436-1439.*

Zhang et al. "Personalized MTV Affective Analysis Using User Profile" 2008. Advances in Multimedia Information Processing: Lecture Notes in Computer Science. vol. 5353/2008. pp. 327-337.*

Yang et al. ("A regression Approach to Music Emotion Recognition". Feb. 2008. IEEE Transactions on Audio, Speech, and Language Processing. pp. 448-457.*

Yang et al. ("Music Emotion Classification: A fuzzy Approach". 2006. Proceedings of the 14th annual ACM international conference on Multimedia. pp. 81-84.*

Kaminskyj et al. ("A study of Human Mood Tagging of Musical Pieces" 2007. Proceedings of International Conference on Music Communication. pp. 68-71.*

* cited by examiner

FIG. 7

| | $G_1$ | $G_2$ | ... | $G_k$ |
|---|---|---|---|---|
| EMOTION TYPE | $A_1, A_6, A_{12}$ | $A_7, A_{14}, A_4, A_{36}, A_{38}$ | ... | $A_{23}, A_{N-3}$ |
| NUMBER OF TIMES EACH EMOTION TYPE IS DETECTED | (20, 3, 14) | (4, 12, 78) 43, 12) | | (97, 12) |
| GROUP PROBABILITY DISTRIBUTION | pdf($G_1$) | pdf($G_2$) | | pdf($G_k$) |
| PROBABILITY DISTRIBUTION FOR EACH EMOTION TYPE | pdf($A_1$) pdf($A_6$) pdf($A_{12}$) | pdf($A_7$) pdf($A_{14}$) pdf($A_4$) pdf($A_{36}$) pdf($A_{38}$) | | pdf($A_{23}$) pdf($A_{N-3}$) |

600

MUSIC SEARCH APPARATUS AND METHOD USING EMOTION MODEL

CROSS REFERENCE TO RELATED APPLICATIONS

This application claims the benefit of Korean Patent Application Nos. 10-2010-0084965 filed on Aug. 31, 2010 and 10-2011-0053785 filed on Jun. 3, 2011, which are hereby incorporated by reference in their entirety into this application.

BACKGROUND OF THE INVENTION

1. Technical Field

The present invention relates generally to a music search apparatus and method using an emotion model and, more particularly, to an apparatus and method for searching for music using an emotion model that is generated according to similarity between emotion types.

2. Description of the Related Art

With a rapid increase in the amount of information, demands for technology for searching for, classifying and recommending information have increased. In particular, when the number of files exceeds several thousands or several tens of thousands as in the case of music files, technology for searching for and recommending the desired music is required.

In the prior art, genre information and singer information were used to search for and recommend music. A genre is a category required to classify music according to the form or features thereof and has been most widely used. Singer information enables music to be searched for and recommended by grouping singers that share similar musical tendencies based on the singers' musical tendencies. However, this results in the inconvenience of preliminary information about genres being required and that of the names of all singers, the names of singers who share similar musical tendencies, or songs sung by relevant singers having to be known if music is to be searched for based on singers.

SUMMARY OF THE INVENTION

Accordingly, the present invention has been made keeping in mind the above problems occurring in the prior art, and an object of the present invention is to provide a music search apparatus and method using an emotion model, which search for music using an emotion model that is generated according to similarity between emotion types.

In accordance with an aspect of the present invention, there is provided a music search apparatus using an emotion model including a music database (DB), an emotion model generation unit and a music search unit. The music DB stores sound source data about a plurality of pieces of music and Arousal-Valence (AV) coefficients of the respective pieces of music. The emotion model generation unit classifies different emotion types into a plurality of groups, and generates an emotion classification model from using respective probability distributions of the plurality of groups for an AV coefficient plane. The music search unit identifies an emotion type using information entered by a user when a music search request is received, detects an AV coefficient range for designating an AV coefficient corresponding to the identified emotion type from using the emotion classification model, and searches the music DB for music corresponding to the AV coefficient range.

Preferably, the emotion model generation unit may classify the different emotion types into the plurality of groups based on similarity between the different emotion types.

Preferably, the emotion model generation unit may calculate similarity between a plurality of column vectors respectively corresponding to the different emotion types and then classify the different emotion types into the plurality of groups based on the calculated similarity.

Preferably, the emotion model generation unit may calculate the respective probability distributions of the plurality of groups from using respective AV coefficients of the different emotion types.

Preferably, the emotion model generation unit may calculate the respective probability distributions of the plurality of groups from using respective probability distributions of the different emotion types for the AV coefficient plane.

Preferably, the music DB may calculate AV coefficients of the pieces of music from using regression analysis.

Preferably, the music search unit may generate a music list of pieces of music that were found.

In accordance with another aspect of the present invention, there is provided a music search method using an emotion model, including identifying an emotion type corresponding to identification information received according to a music search request, identifying from an emotion classification model a group containing the identified emotion type, detecting an Arousal-Valence (AV) coefficient range for designating an AV coefficient of music desired to be searched for according to a probability distribution of the identified group, searching for pieces of music corresponding to the AV coefficient range from using respective AV coefficients of pieces of music stored in a database (DB), and generating a music list of the pieces of music that are found.

Preferably, the identifying from the emotion classification model may be configured to identify the group containing the identified emotion type from the emotion classification model in which different emotion types are classified into a plurality of groups based on similarity between the different emotion types.

Preferably, the emotion classification model may be generated by classifying the different emotion types into a plurality of groups based on similarity between a plurality of column vectors respectively corresponding to the different emotion types.

Preferably, the identifying the emotion type may be configured to identify an emotion type corresponding to the identification information that contains an AV coordinate.

Preferably, the identifying the emotion type may be configured to identify an emotion type corresponding to the identification information that contains a preset exemplary picture.

BRIEF DESCRIPTION OF THE DRAWINGS

The above and other objects, features and advantages of the present invention will be more clearly understood from the following detailed description taken in conjunction with the accompanying drawings, in which:

FIG. 7 is a diagram showing a table representing an emotion classification model according to an embodiment of the present invention;

DESCRIPTION OF THE PREFERRED EMBODIMENTS

Figure 1:
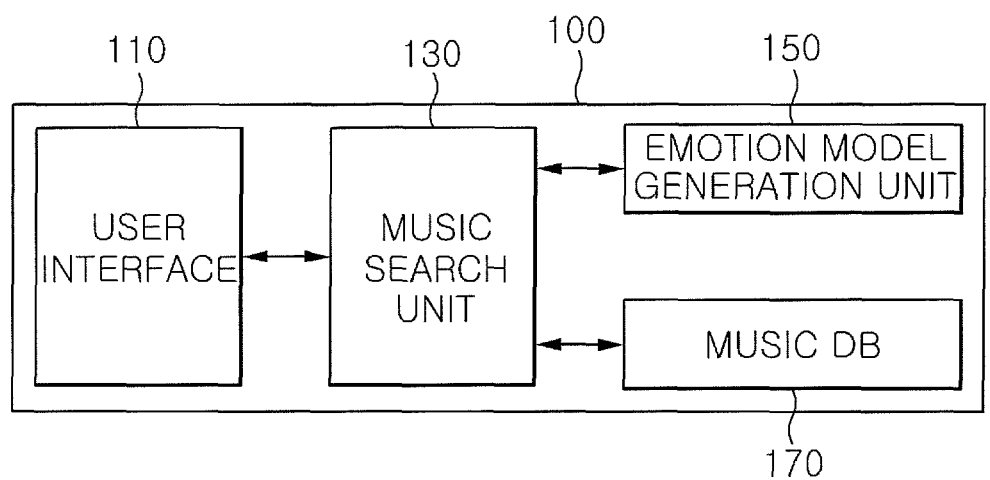
FIG. 1 is a diagram showing the construction of a music search apparatus according to an embodiment of the present invention.

The present invention will be described in detail below with reference to the attached drawings. If in the specification, detailed descriptions of well-known functions or configurations may unnecessarily make the gist of the present invention obscure, the detailed descriptions will be omitted. The embodiments of the present invention are provided to describe the present invention more completely to those skilled in the art. Therefore, the shapes or sizes of components in the drawings may be exaggerated for the sake of providing a more definite description.

Hereinafter, a music search apparatus and method using an emotion model according to embodiments of the present invention will be described with reference to the attached drawings.

A music search apparatus according to an embodiment of the present invention will be described with reference to FIG. 1.

FIG. 1 is a diagram showing the construction of a music search apparatus according to an embodiment of the present invention.

As shown in FIG. 1, a music search apparatus 100 according to an embodiment of the present invention provides a list of pieces of music satisfying a music search request as the results of the music search when the music search request is received from a user, and includes a user interface 110, a music search unit 130, an emotion model generation unit 150, and a music database (DB) 170.

The user interface 110 receives a music search request from the user, and provides the user with a list of pieces of music satisfying the received music search request. Here, the user interface 110 may also receive identification information required to identify an emotion type from the user when receiving the music search request. In this case, the user interface 110 may receive the identification information from using previously given exemplary pictures, or may receive, as the identification information, an Arousal-Valence coordinate (hereinafter referred to as "AV coordinate") which represent the degree of affirmation or denial of an emotion (valence) by the intensity of an emotion (arousal), or may receive a music sample as the identification information.

The music search unit 130 identifies an emotion type from the identification information received in response to the user's music search request, detects an Arousal-Valence coefficient (hereinafter also referred to as an 'AV coefficient') corresponding to the identified emotion type in conjunction with the emotion model generation unit 150, and searches the music DB 170 for pieces of music corresponding to the detected AV coefficient. Here, the music search unit 130 can generate a music list of the pieces of music found from the music DB 170.

The emotion model generation unit 150 generates an emotion classification model in which similar emotion types are grouped from using a distribution matrix in which emotion types felt by human beings in response to hearing a plurality of pieces of music are represented by a matrix, and detects a range of the AV coefficient corresponding to a specific emotion type on the basis of the generated emotion classification model. In this case, the emotion model generation unit 150 may provide the range of the AV coefficient to the music search unit 130.

The music DB 170 stores, for each of a plurality of pieces of music, sound source data, a music title, a singer, a genre, an album title, release year, the number of plays, a hash value, an AV coefficient, an audio fingerprint, etc.

In this case, the music DB 170 can calculate hash values of respective pieces of music from using a hash function such as Message-Digest algorithm 5 (MD5).

Further, the music DB 170 can calculate AV coefficients of the respective pieces of music from using regression analysis based on a Mel-Frequency Cepstral Coefficient (hereinafter also referred to as an "MFCC") for each piece of music, Octave-based Spectral Contrast (hereinafter also referred to as "OSC"), energy, tempo, or the like.

Furthermore, the music DB 170 can generate audio fingerprints of the respective pieces of music by extracting features of the pieces of music in a compressed form.

Here, the music DB 170 can identify relevant music from sound source data from using the hash value or audio fingerprint of each piece of music.

Next, a method of generating an emotion classification model according to an embodiment of the present invention will be described with reference to FIG. 2.

Figure 2:
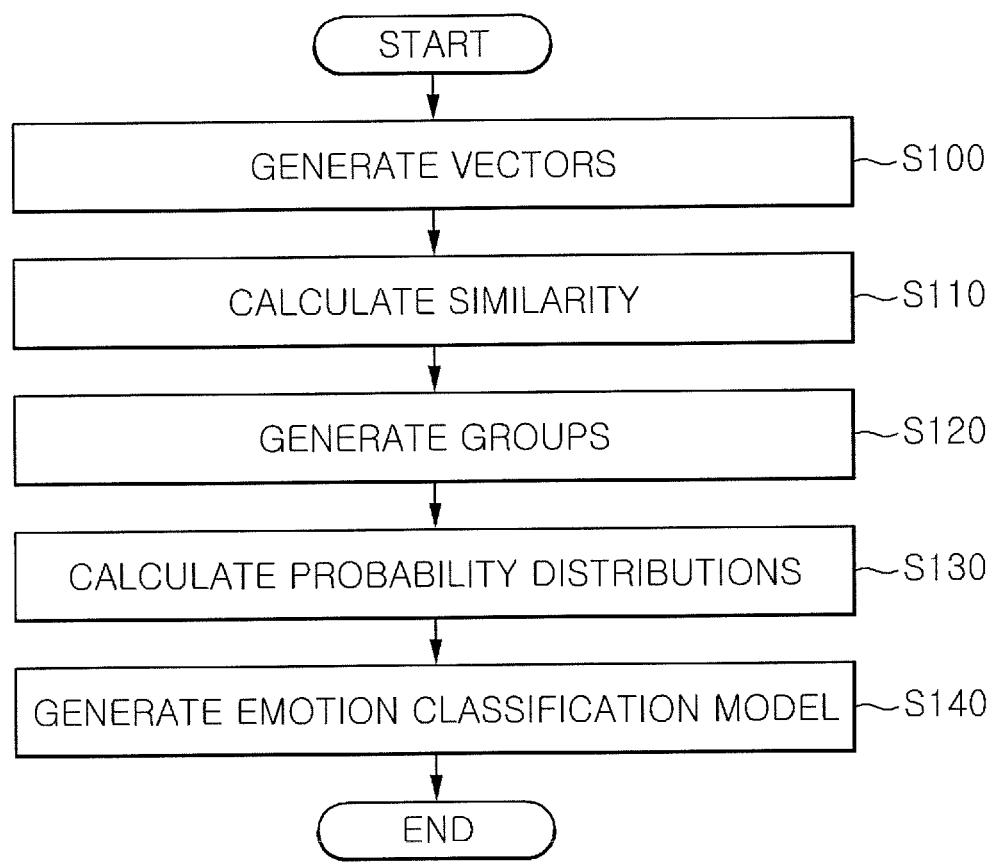
FIG. 2 is a flowchart showing a method of generating an emotion classification model according to an embodiment of the present invention.

FIG. 2 is a diagram showing a method of generating an emotion classification model according to an embodiment of the present invention.

As shown in FIG. 2, an emotion model generation unit 150 generates column vectors corresponding to respective emotion types from a distribution matrix in which emotion types felt by human beings in response to hearing a plurality of pieces of music are represented by a matrix at step S100.

Next, the emotion model generation unit 150 measures cosine similarity indicating similarity between two vectors and then calculates similarity between the column vectors at step S110. In this case, the emotion model generation unit 150 can measure similarity between emotion types corresponding to the respective column vectors using the similarity between the column vectors. Here, the emotion model generation unit 150 can measure the cosine similarity between two vectors by calculating cosine of an angle between the two vectors.

Thereafter, the emotion model generation unit 150 classifies the emotion types into a plurality of groups based on the similarity between the column vectors, and then generates the plurality of groups at step S120. In this case, the emotion model generation unit 150 can classify similar emotion types into an identical group based on the similarity between the column vectors.

Next, the emotion model generation unit 150 calculates respective probability distributions for the plurality of groups for an Arousal-Valence coefficient plane (hereinafter also referred to as an "AV coefficient plane") from using the AV coefficients corresponding to the respective emotion types at step S130. Here, the emotion model generation unit 150 is capable of calculating respective probability distributions for the emotion types for the AV coefficient plane, and is then capable of calculating respective probability distributions for the plurality of groups from using the probability distributions of the respective emotion types.

Thereafter, the emotion model generation unit 150 generates an emotion classification model in which similar emotion types are grouped, from using the respective probability distributions for the plurality of groups at step S140.

Next, the distribution matrix in which emotion types felt by human beings in response to hearing a plurality of pieces of music are represented by a matrix according to an embodiment of the present invention will be described with reference to FIG. 3.

Figure 3:
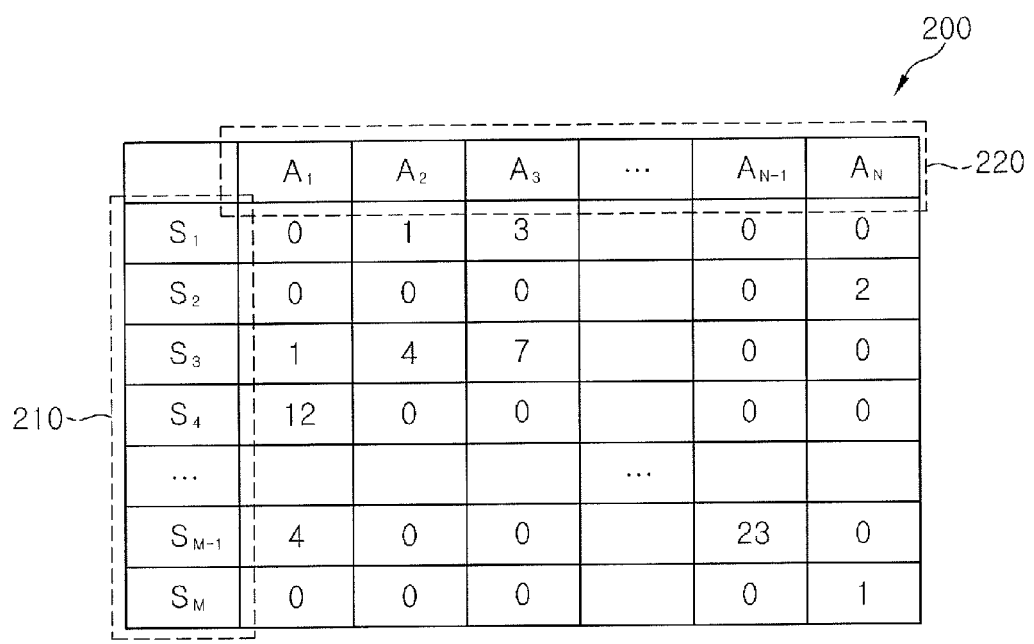
FIG. 3 is a diagram showing a distribution matrix for emotion types according to an embodiment of the present invention.

FIG. 3 is a diagram showing the distribution matrix for emotion types according to an embodiment of the present invention.

As shown in FIG. 3, a distribution matrix 200 is a matrix by which a plurality of emotion types 220 felt by human beings in response to hearing a plurality of pieces of music 210 are represented.

In detail, the distribution matrix 200 indicates the number of times that each of N emotion types, that is, a 1st emotion type $A_1$, a 2nd emotion type $A_2$, a 3rd emotion type $A_3$, ..., an N−1th emotion type $A_{N-1}$, and an Nth emotion type $A_N$, is detected for each of M pieces of music, that is, a 1st piece of music $S_1$, a 2nd piece of music $S_2$, a 3rd piece of music $S_3$, a 4th piece of music $S_4$, ..., an M−1th piece of music $S_{M-1}$, and an Mth piece of music $S_M$.

The distribution matrix 200 denotes the case where the 2nd emotion type $A_2$ is detected once and the 3rd emotion type $A_3$ is detected three times for the 1st piece of music $S_1$.

The distribution matrix 200 denotes the case where the Nth emotion type $A_N$ is detected twice for the 2nd piece of music $S_2$.

The distribution matrix 200 denotes the case where the 1st emotion type $A_1$ is detected once, the 2nd emotion type $A_2$ is detected 4 times, and the 3rd emotion type $A_3$ is detected 7 times for the 3rd piece of music $S_3$.

The distribution matrix 200 denotes the case where the 1st emotion type $A_1$ is detected 12 times for the 4th piece of music $S_4$.

The distribution matrix 200 denotes the case where the 1st emotion type $A_1$ is detected 4 times and the N−1th emotion type $A_{N-1}$ is detected 23 times for the M−1 piece of music $S_{M-1}$.

The distribution matrix 200 denotes the case where the Nth emotion type $A_N$ is detected once for the Mth piece of music $S_M$.

Next, an AV coefficient plane according to an embodiment of the present invention will be described with reference to FIG. 4.

Figure 4:
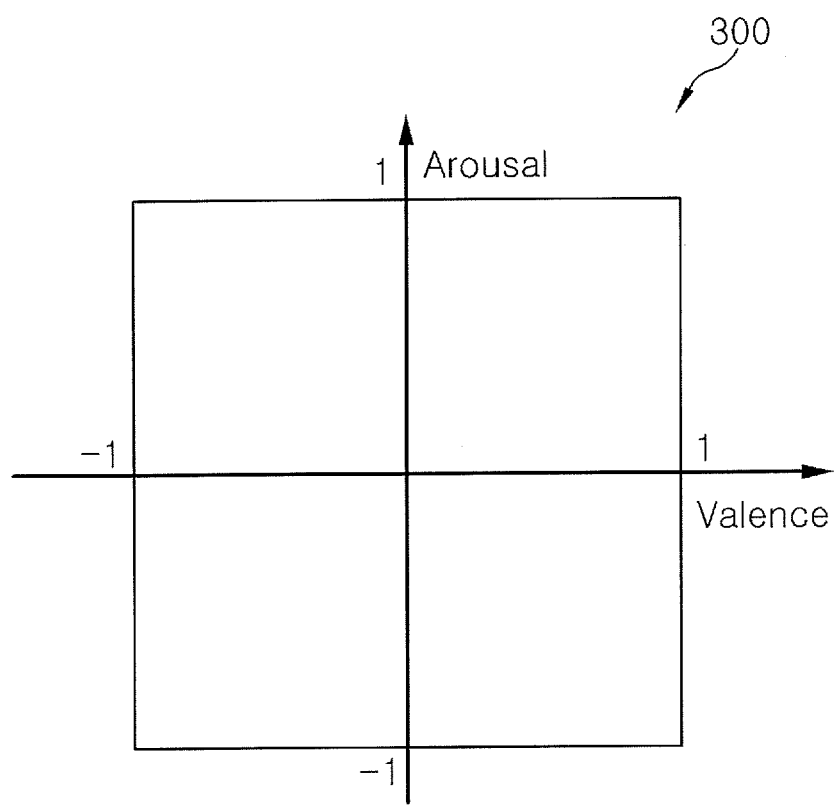
FIG. 4 is a diagram showing an AV coefficient plane according to an embodiment of the present invention.

FIG. 4 is a diagram showing an AV coefficient plane according to an embodiment of the present invention.

As shown in FIG. 4, in an AV coefficient plane 300, the lateral axis of the coordinate plane denotes the degree of affirmation or denial of an emotion (Valence) and the vertical axis of the coordinate plane denotes the intensity of an emotion (Arousal).

In the AV coefficient plane 300, the AV coordinates may be designated such that coordinate values on the lateral axis range from −1 to 1, and coordinate values on the vertical axis range from −1 to 1.

Next, a method by which the emotion model generation unit generates a probability distribution model for a specific group of an emotion classification model according to an embodiment of the present invention will be described with reference to FIG. 5.

Figure 5:
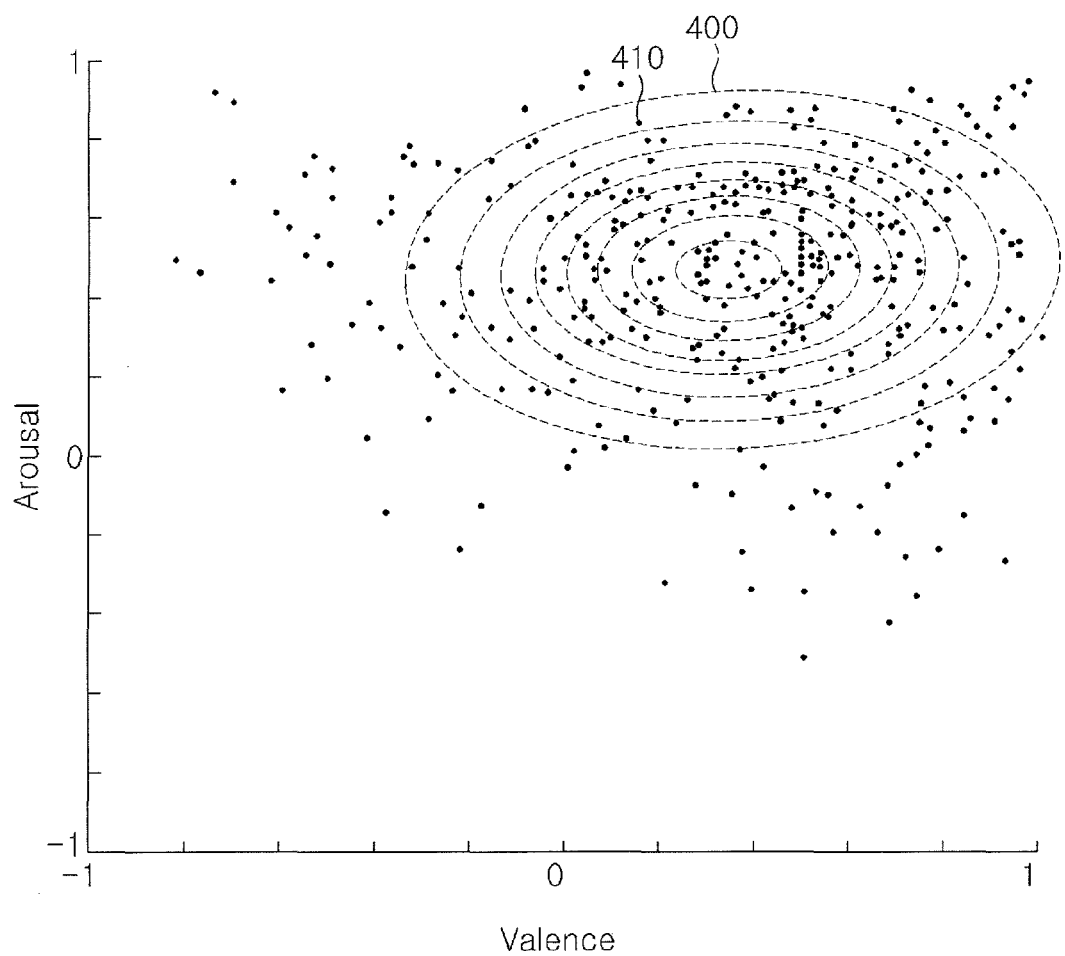
FIG. 5 is a diagram showing an example in which a probability distribution model for a specific group of an emotion classification model is depicted in the AV coefficient plane according to an embodiment of the present invention.

FIG. 5 is a diagram showing an example in which a probability distribution model for a specific group of the emotion classification model is depicted in the AV coefficient plane according to an embodiment of the present invention.

As shown in FIG. 5, the emotion model generation unit 150 indicates AV coefficients corresponding to a specific group as a plurality of AV coordinates 410 in the AV coefficient plane, and can model a probability distribution model 400 for the relevant group from using the plurality of AV coordinates 410 indicated in the AV coefficient plane. For example, the probability distribution model 400 may be formed by modeling a group containing emotion types such as 'glad', 'cheerful', 'delightful', and 'pleasant'.

Here, the emotion model generation unit 150 may represent the plurality of AV coordinates 410 indicated in the AV coefficient plane by a probability density function, and may generate a probability distribution model 400 for the relevant group.

In this case, the probability distribution model 400 may be divided into a plurality of areas depending on probability distribution values and have higher probability distribution values in a direction toward the central area of the probability distribution model 400.

Further, in the case of the AV coordinates 410, the values on the lateral axis indicating the degree of affirmation or denial of an emotion (valence) in the AV coefficient plane may range from −1 to 1 and the values on the vertical axis indicating the intensity of an emotion (arousal) may range from −1 to 1.

Next, a method by which the emotion model generation unit generates a probability distribution model for the emotion types of a specific group according to an embodiment of the present invention will be described with reference to FIG. 6.

Figure 6:
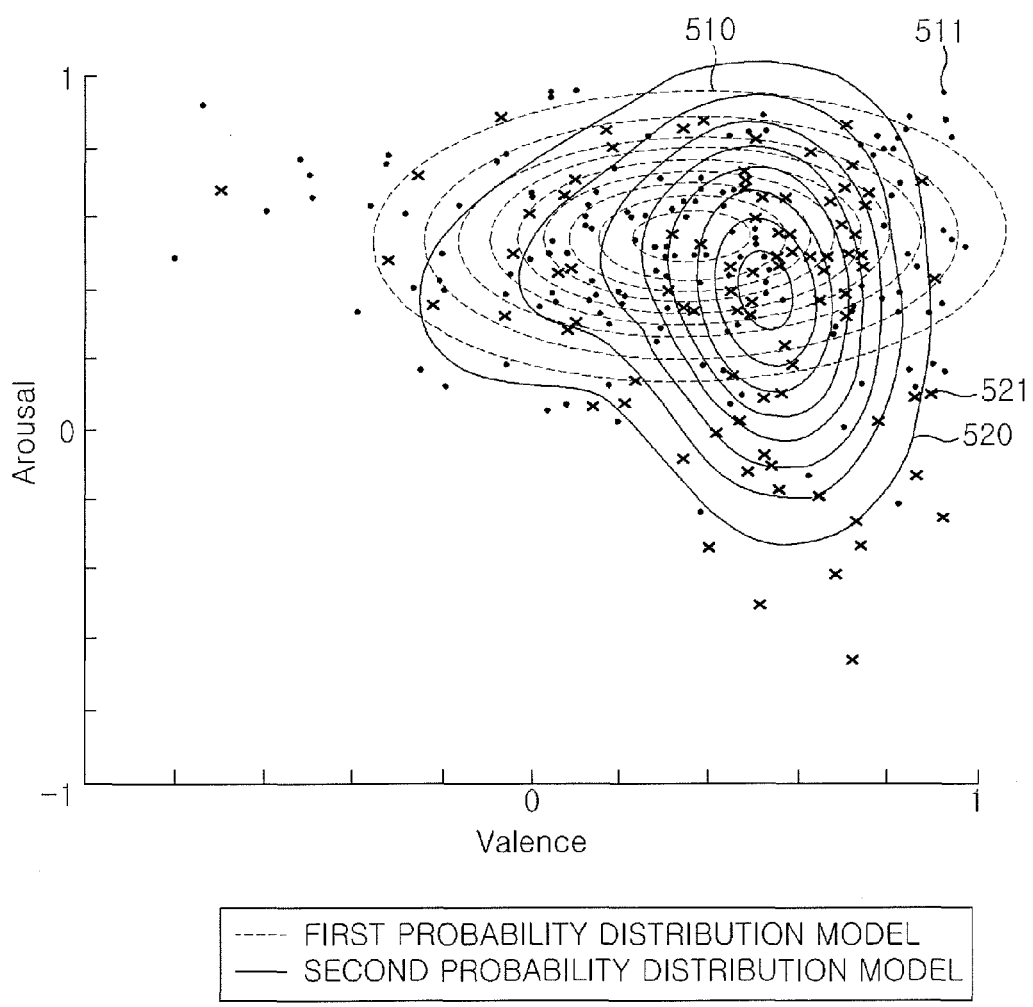
FIG. 6 is a diagram showing an example in which a probability distribution model for a specific emotion type is depicted in the AV coefficient plane according to an embodiment of the present invention.

FIG. 6 is a diagram showing an example in which a probability distribution model for a specific emotion type is depicted in an AV coefficient plane according to an embodiment of the present invention.

As shown in FIG. 6, the emotion model generation unit 150 can indicate AV coefficients corresponding to the first emotion type of a specific group as a plurality of first AV coordinates 511 in the AV coefficient plane, and can model a first probability distribution model 510 for the first emotion type from using the plurality of first AV coordinates 511 indicated in the AV coefficient plane. For example, the first probability distribution model 510 may correspond to one in which the first emotion type corresponding to 'cheerful' is modeled.

In this case, the emotion model generation unit 150 may represent the plurality of first AV coordinates 511 indicated in the AV coefficient plane by a probability density function and then generate a first probability distribution model 510 for the first emotion type.

Here, the first probability distribution model 510 can be divided into a plurality of areas depending on probability distribution values and have higher probability distribution values in a direction toward the central area of the first probability distribution model 510.

Further, in the case of the first AV coordinates 511, the values on the lateral axis indicating the degree of affirmation or denial of an emotion (valence) in the AV coefficient plane may range from −1 to 1 and the values on the vertical axis indicating the intensity of an emotion (arousal) may range from −1 to 1.

The emotion model generation unit 150 may indicate AV coefficients corresponding to the second emotion type of the specific group as second AV coordinates 521 in the AV coefficient plane and may model a second probability distribution model 520 for the second emotion type from using the plurality of second AV coordinates 521 indicated in the AV coefficient plane. For example, the second probability distribution model 520 may correspond to one in which the second emotion type corresponding to 'glad' is modeled.

In this case, the emotion model generation unit 150 may represent the plurality of second AV coordinates 521 indicated in the AV coefficient plane by a probability density function and then generate the second probability distribution model 520 for the second emotion type.

Here, the second probability distribution model 520 may be divided into a plurality of areas depending on probability distribution values and have higher values in a direction toward the central area of the second probability distribution model 520.

Further, in the case of the second AV coordinates 521, the values on the lateral axis indicating the degree of affirmation or denial of an emotion (valence) in the AV coefficient plane may range from −1 to 1 and the values on the vertical axis indicating the intensity of an emotion (arousal) may range from −1 to 1.

Next, an emotion classification model in which similar emotion types are grouped according to an embodiment of the present invention will be described in detail with reference to FIG. 7.

FIG. 7 is a diagram showing a table representing an emotion classification model according to an embodiment of the present invention.

As shown in FIG. 7, an emotion classification model 600 includes a plurality of groups generated by classifying similar emotion types into an identical group. For example, the emotion classification model 600 may include K groups, that is, a 1st group $G_1$, a 2nd group $G_2$, ..., a Kth group $G_K$.

The emotion classification model 600 includes a plurality of emotion types for each group. For example, the 1st group $G_1$ may contain a 1st emotion type $A_1$, a 6th emotion type $A_6$ and a 12th emotion type $A_{12}$, the 2nd group $G_2$ may contain a 7th emotion type $A_7$, a 14th emotion type $A_{14}$, a 4th emotion type $A_4$, a 36th emotion type $A_{36}$ and a 38th emotion type $A_{38}$, and the Kth group $G_K$ may contain a 23rd emotion type $A_{23}$ and an N−3rd emotion type $A_{N-3}$.

The emotion classification model 600 includes the number of times that each emotion type contained in each group is detected. For example, in the 1st group $G_1$, the 1st emotion type $A_1$ can be detected 20 times, the 6th emotion type $A_6$ can be detected 3 times, and the 12th emotion type $A_{12}$ can be detected 14 times. In the 2nd group $G_2$, the 7th emotion type $A_7$ can be detected 4 times, the 14th emotion type $A_{14}$ can be detected 12 times, the 4th emotion type $A_4$ can be detected 78 times, the 36th emotion type $A_{36}$ can be detected 43 times, and the 38th emotion type $A_{38}$ can be detected 12 times. Further, in the Kth group $G_K$, the 23rd emotion type $A_{23}$ can be detected 97 times and the N−3rd emotion type $A_{N-3}$ can be detected 12 times.

The emotion classification model 600 includes a plurality of group probability distributions respectively corresponding to a plurality of groups. For example, the 1st group $G_1$ may have a 1st group probability distribution $pdf(G_1)$, the 2nd group $G_2$ may have a 2nd group probability distribution $pdf(G_2)$, and the Kth group $G_K$ may have a Kth group probability distribution $pdf(G_K)$.

The emotion classification model 600 includes probability distributions for respective emotion types contained in each group. For example, the 1st emotion type $A_1$ of the 1st group $G_1$ may have a 1st probability distribution $pdf(A_1)$, the 6th emotion type $A_6$ may have a 6th probability distribution $pdf(A_6)$, and the 12th emotion type $A_{12}$ may have a 12th probability distribution $pdf(A_{12})$.

Further, the 7th emotion type $A_7$ of the 2nd group $G_2$ may have a 7th probability distribution $pdf(A_7)$, the 14th emotion type $A_{14}$ may have a 14th probability distribution $pdf(A_{14})$, the 4th emotion type $A_4$ may have a 4th probability distribution $pdf(A_4)$, the 36th emotion type $A_{36}$ may have a 36th probability distribution $pdf(A_{36})$, and the 38th emotion type $A_{38}$ may have a 38th probability distribution $pdf(A_{38})$.

Furthermore, the 23rd emotion type $A_{23}$ of the Kth group $G_K$ may have a 23rd probability distribution $pdf(A_{23})$, and the N−3rd emotion type $A_{N-3}$ may have an N−3rd probability distribution $pdf(A_{N-3})$.

Next, a music search method according to an embodiment of the present invention will be described with reference to FIG. 8.

Figure 8:
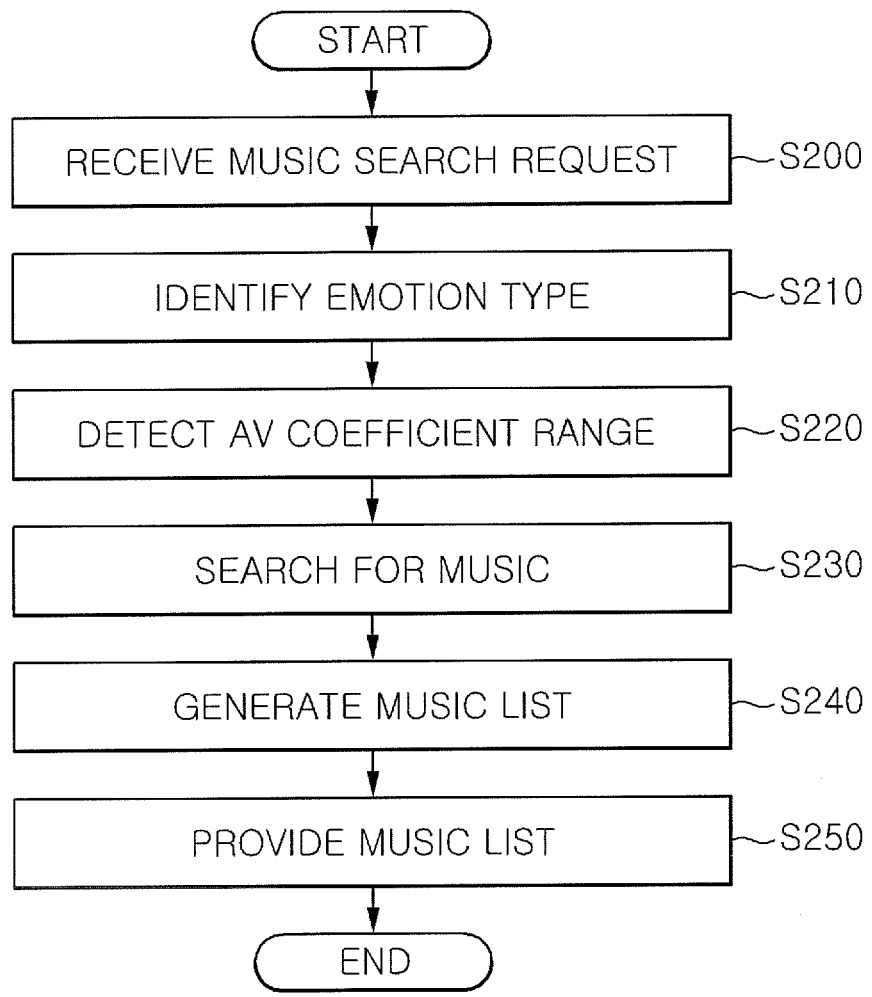
FIG. 8 is a flowchart showing a music search method according to an embodiment of the present invention.

FIG. 8 is a flowchart showing a music search method according to an embodiment of the present invention.

As shown in FIG. 8, the user interface 110 receives a music search request together with identification information required to identify an emotion type from the user at step S200. In this case, the user may enter identification information by designating AV coordinates in the AV coefficient plane or selecting one or more from among previously given exemplary pictures so as to be provided with music corresponding to a specific emotion type.

Next, the music search unit 130 identifies an emotion type corresponding to the received identification information at step S210. Here, if an AV coordinate is input as the identification information, the music search unit 130 may identify an emotion type corresponding to the relevant AV coordinate on the basis of emotion types for respective areas preset for the AV coefficient plane. If a specific exemplary picture is selected, the music search unit 130 may identify a preset emotion type according to the selected exemplary picture.

Thereafter, the music search unit 130 identifies a group containing the identified emotion type from the emotion classification model stored in the emotion model generation unit 150, and then detects an AV coefficient range in which the AV coefficient of music to be searched for is designated according to the probability distribution of the identified group at step S220.

Next, the music search unit 130 searches for music corresponding to the detected AV coefficient range from using the AV coefficients of the respective pieces of music stored in the music DB 170 at step S230.

Thereafter, the music search unit 130 generates a music list of pieces of music found from the music DB 170 at step S240.

Thereafter, the user interface 110 provides the generated music list for the user at step S250.

Next, a method by which the user enters identification information using exemplary pictures provided by the user interface according to embodiments of the present invention will be described with reference to FIGS. 9 to 11.

Figure 9:
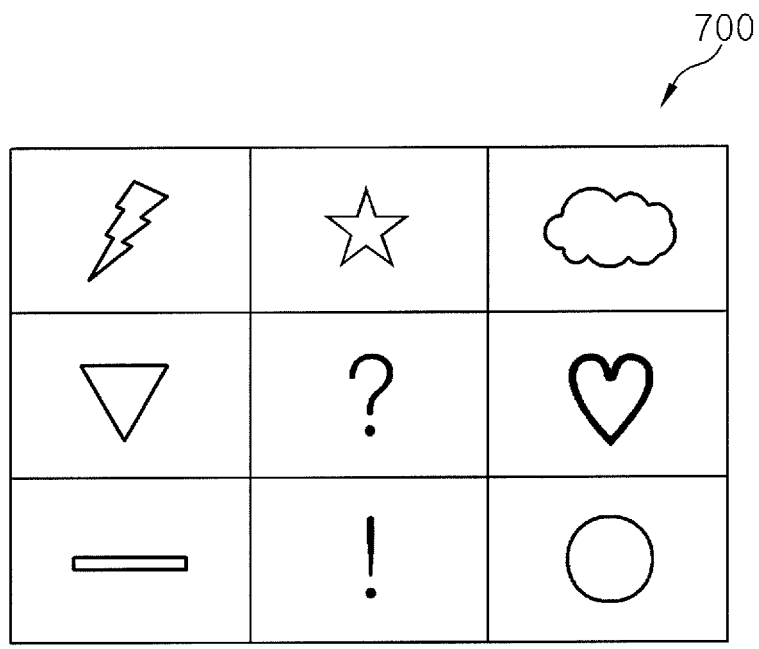
FIG. 9 is a diagram showing exemplary pictures provided by a user interface according to an embodiment of the present invention.

FIG. 9 is a diagram showing exemplary pictures provided by the user interface according to an embodiment of the present invention.

As shown in FIG. 9, the user interface 110 may provide the user with a visual interface 700 including exemplary pictures corresponding to different emotion types.

That is, the user may request a search for music corresponding to a specific emotion type by selecting one or more from among the exemplary pictures using the visual interface 700.

Figure 10:
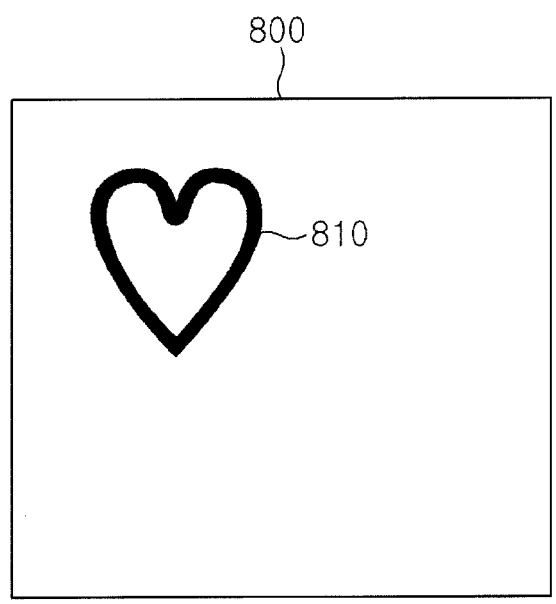
FIG. 10 is a diagram showing the input of an exemplary picture according to a first embodiment of the present invention.

FIG. 10 is a diagram showing the input of an exemplary picture according to a first embodiment of the present invention.

As shown in FIG. 10, a user may enter identification information required to identify an emotion type by personally drawing an exemplary picture 810 on a touch screen 800. For example, the exemplary picture 810 may correspond to an emotion type such as "lovely".

In this case, the user interface 110 may determine the intensity of an emotion (arousal) according to the size of the exemplary picture 810.

Figure 11:
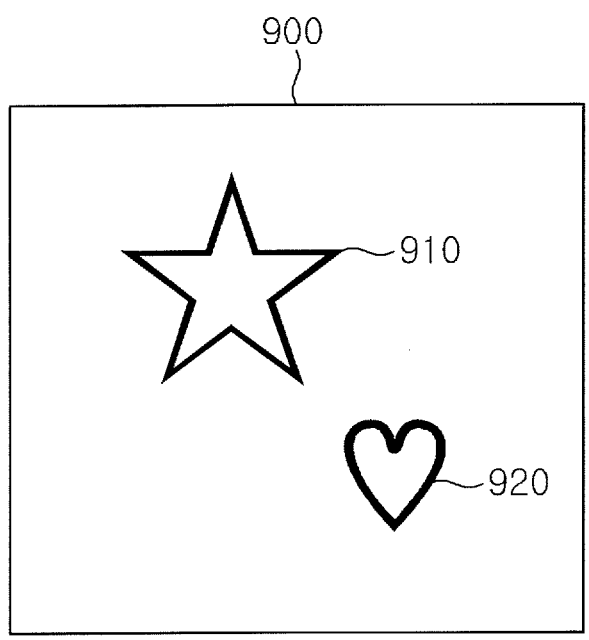
FIG. 11 is a diagram showing the input of an exemplary picture according to a second embodiment of the present invention.

FIG. 11 is a diagram showing the input of an exemplary picture according to a second embodiment of the present invention.

As shown in FIG. 11, the user may enter identification information required to identify emotion types by drawing a plurality of exemplary pictures 910 and 920 on a touch screen 900. For example, the first exemplary picture 910 may correspond to a 'popular song', and the second exemplary picture 920 may correspond to an emotion type such as 'lovely'.

In this case, the user may change an exemplary picture and, at the time of changing the exemplary picture, may maintain his or her previous emotion expression or may add or vary the previous emotion expression through the user's input.

In accordance with the characteristics of the present invention, there is an advantage in that an emotion classification model generated according to the similarity between emotion types is used, so that music fitting the user's intention is searched for, and thus music meeting the user's desired mood can be recommended.

Further, in accordance with the characteristics of the present invention, there is an advantage in that music corresponding to a complex emotion type can be searched for and provided by using an emotion classification model that is generated in consideration of AV coefficients.

Furthermore, in accordance with the characteristics of the present invention, there is an advantage in that a music search service can be provided by simple input via a simple interface such as the selection of AV coordinates or exemplary pictures.

As described above, optimal embodiments have been disclosed in the drawings and the specification. Although specific terms have been used herein, these are only intended to describe the present invention and are not intended to limit the meanings of the present invention or the scope of the present invention disclosed in the claims. Therefore, those skilled in the art will appreciate that various modifications and equivalent other embodiments are possible from the above embodiments. Therefore, the scope of the present invention should be defined by the technical spirit of the accompanying claims.

What is claimed is:

1. A music search apparatus using an emotion model, comprising:
    a hardware computer system comprising a hardware processor and a hardware memory;
    a music database (DB) for storing sound source data about a plurality of pieces of music and Arousal-Valence (AV) coefficients of the respective pieces of music;
    an emotion model generation unit operating on the hardware computer system and adapted to classify different emotion types into a plurality of groups, and generate an emotion classification model from using respective probability distributions of the plurality of groups for an AV coefficient plane; and
    a music search unit operating on the hardware computer system and adapted to, when a music search request is received, identify an emotion type from using information entered by a user, detect an AV coefficient range for designating an AV coefficient corresponding to the identified emotion type from using the emotion classification model, and search the music DB for music corresponding to the AV coefficient range,
    wherein the emotion model generation unit is adapted to measure similarity between the different emotion types using similarity between column vectors generated from a distribution matrix, wherein the distribution matrix indicates a number of times that each of the different emotion types are selected by users for each piece of music, and classify similar emotion types into an identical group based on the measured similarity between the different emotion types.

2. The music search apparatus of claim 1, wherein the emotion model generation unit is further adapted to calculate the respective probability distributions of the plurality of groups from using respective AV coefficients of the different emotion types.

3. The music search apparatus of claim 2, wherein the emotion model generation unit is further adapted to calculate the respective probability distributions of the plurality of groups from using respective probability distributions of the different emotion types for the AV coefficient plane.

4. The music search apparatus of claim 1, wherein the music DB calculates AV coefficients of the pieces of music from using regression analysis.

5. The music search apparatus of claim 1, wherein the music search unit is further adapted to generate a music list of pieces of music that were found.

6. A music search method using an emotion model, comprising:
    identifying an emotion type corresponding to identification information received according to a music search request;
    identifying a group containing the identified emotion type from an emotion classification model in which different emotion types are classified into a plurality of groups based on similarity between the different emotion types;
    detecting an Arousal-Valence (AV) coefficient range for designating an AV coefficient of music desired to be searched for according to a probability distribution of the identified group;
    searching for pieces of music corresponding to the AV coefficient range from using respective AV coefficients of pieces of music stored in a database (DB); and
    generating a music list of the pieces of music that are found,
    wherein the emotion classification model is generated by measuring the similarity between the different emotion types using similarity between column vectors generated from a distribution matrix, wherein the distribution matrix indicates a number of times that each of the different emotion types are selected by users for each piece of music, and classifying similar emotion types into an identical group based on the measured similarity between the different emotion types.

7. The music search method of claim 6, wherein the identification information contains an AV coordinate and the identifying the emotion type is configured to identify an emotion type corresponding to the identification information that contains the AV coordinate.

8. The music search method of claim 6, wherein the identification information contains a preset exemplary picture and the identifying the emotion type is configured to identify an emotion type corresponding to the identification information that contains the preset exemplary picture.

9. A music search apparatus using an emotion model, comprising:
- a hardware computer system comprising a hardware processor and a hardware memory;
- a music database (DB) that stores Arousal-Valence (AV) coefficients for respective pieces of music, wherein pluralities of AV coefficients correspond to respective emotion types;
- an emotion model generation unit operating on the hardware computer system and adapted to group two or more of the emotion types together into a group; and
- a music search unit operating on the hardware computer system and adapted to, when a music search request is received, identify an emotion type from a group, containing the identified emotion type, from an emotion classification model generated by measuring similarity between different emotion types using similarity between column vectors generated from a distribution matrix, wherein the distribution matrix indicates a number of times that each of the different emotion types are selected by users for each piece of music, designate an AV coefficient corresponding to the identified emotion type, and search the music DB for music corresponding to the AV coefficient.

* * * * *